United States Patent
Molenda et al.

(10) Patent No.: US 10,450,196 B2
(45) Date of Patent: Oct. 22, 2019

(54) PROCESS OF FABRICATION OF CRYSTALLINE NANOMETRIC LITHIUM TRANSITION METAL PHOSPHATE

(71) Applicant: AKADEMIA GÓRNICZO-HUTNICZA IM. STANISLAWA STASZICA W KRAKOWIE, Kraków (PL)

(72) Inventors: Janina Molenda, Jerzmanowice (PL); Wojciech Zając, Jaworzno (PL); Andrzej Kulka, Kraków (PL)

(73) Assignee: Akademia Górniczo-Hutnicza im. Stanisława Staszica w Krakowie, Kraków (PL)

( * ) Notice: Subject to any disclaimer, the term of this patent is extended or adjusted under 35 U.S.C. 154(b) by 0 days.

(21) Appl. No.: 15/122,159

(22) PCT Filed: Mar. 4, 2015

(86) PCT No.: PCT/PL2015/000037
§ 371 (c)(1),
(2) Date: Aug. 26, 2016

(87) PCT Pub. No.: WO2015/137836
PCT Pub. Date: Sep. 17, 2015

(65) Prior Publication Data
US 2016/0368770 A1 Dec. 22, 2016

(30) Foreign Application Priority Data
Mar. 12, 2014 (PL) .......................................... 407506

(51) Int. Cl.
*C01B 25/45* (2006.01)
*C01B 25/37* (2006.01)
*H01M 4/58* (2010.01)

(52) U.S. Cl.
CPC .............. *C01B 25/45* (2013.01); *C01B 25/37* (2013.01); *H01M 4/5825* (2013.01)

(58) Field of Classification Search
CPC ............................. C01B 25/45; H01M 4/5825
See application file for complete search history.

(56) References Cited

U.S. PATENT DOCUMENTS

| 5,910,382 A | 6/1999 | Goodenough |
| 8,524,397 B1 | 9/2013 | Yumoto |

(Continued)

FOREIGN PATENT DOCUMENTS

| CA | 2803760 | 10/1997 |
| CN | 102838102 | 12/2012 |

(Continued)

OTHER PUBLICATIONS

C. Delacourt, C. Wurm, P. Reale, M. Morcrette, C. Masquelier, "Low temperature preparation of optimized phosphates for Li-battery applications", Solid State Ionics 173 (2004) 113-118.

(Continued)

*Primary Examiner* — Amber R Orlando
*Assistant Examiner* — Syed T Iqbal
(74) *Attorney, Agent, or Firm* — Andrew Malarz, Esq.

(57) ABSTRACT

A process of fabrication of nanometric lithium transition metal phosphate with the general formula $LiMPO_4$, where M denotes a metal ion or mixture of metal ions from a group comprising Fe, Mn, Co, and Ni, particularly lithium iron (II) phosphate, $LiFePO_4$, by co-precipitation of nanometric powder from a boiling aqueous solution with the addition of organic liquid containing $Li^+$, $M^{2+}$, $PO_4^{3-}$ ions which after filtering, washing with water and alcohol, is characterised by the fact that a reducing agent in the amount of 10-100 mol. % in relation to transition metal ions is introduced to the solution containing at least one of the ions selected from a (Continued)

group comprising $Li^+$, $M^{2+}$, $PO_4^{3-}$; and/or a reducing gas mixture is passed through the solution. At least one of the following agents is applied as a reducing agent: potassium iodide, ammonium thiosulphate, glucose, ascorbic acid, tin (II) chloride.

4 Claims, 1 Drawing Sheet

(56) References Cited

U.S. PATENT DOCUMENTS

| | | | | |
|---|---|---|---|---|
| 2001/0009652 | A1* | 7/2001 | Arno | B01D 53/14 |
| | | | | 423/240 R |
| 2004/0151649 | A1 | 8/2004 | Hemmer | |
| 2009/0117020 | A1* | 5/2009 | Manthiram | H01M 4/5825 |
| | | | | 423/274 |
| 2013/0130111 | A1* | 5/2013 | Bodoardo | C01B 25/45 |
| | | | | 429/221 |

FOREIGN PATENT DOCUMENTS

| | | |
|---|---|---|
| CN | 102842716 | 12/2012 |
| CN | 102842716 A * | 12/2012 |
| DE | 201011056812 | 6/2013 |
| DE | 102013216814 | 3/2014 |
| EP | 2006/005725 | 6/2005 |
| WO | WO2010/023194 | 3/2010 |
| WO | WO2010/149681 | 12/2010 |
| WO | WO2011/057646 | 5/2011 |
| WO | WO2011/100487 | 8/2011 |

OTHER PUBLICATIONS

D. Morgan, A Van der Ven, G. Ceder, "Li Conductivity in Li2MPO4 (M=Mn, Fe, Co, Ni) Olivine Materials", Electrochemical and Solid-State Letters, 7 (2004) A30-A32.

R. Amin, P. Balaya, J. Maler, "Anisotropy of electronic and ionic transport in LiFePo4 single crystals", Electrochemical and Solid-State Letters, 10 (2007) A13-A16.

A. Vadivel Murugan, T. Muraliganth, A. Manthiram, "Rapid microwave—solvotherman synthesis of phospho-olivine nanorods and their coating with a mixed conducting polymer for lithium ion batteries", Electro-chemistry Communications 10 (2008) 903-906.

M.K. Devaraju, I. Honma, "Hydrothermal and solvothermal process towards development of LiMPO4 (M=Fe, Mn) nanomaterials for lithium-Ion batteries", Advanced Energy Materials 2 (2012) 284-297.

* cited by examiner

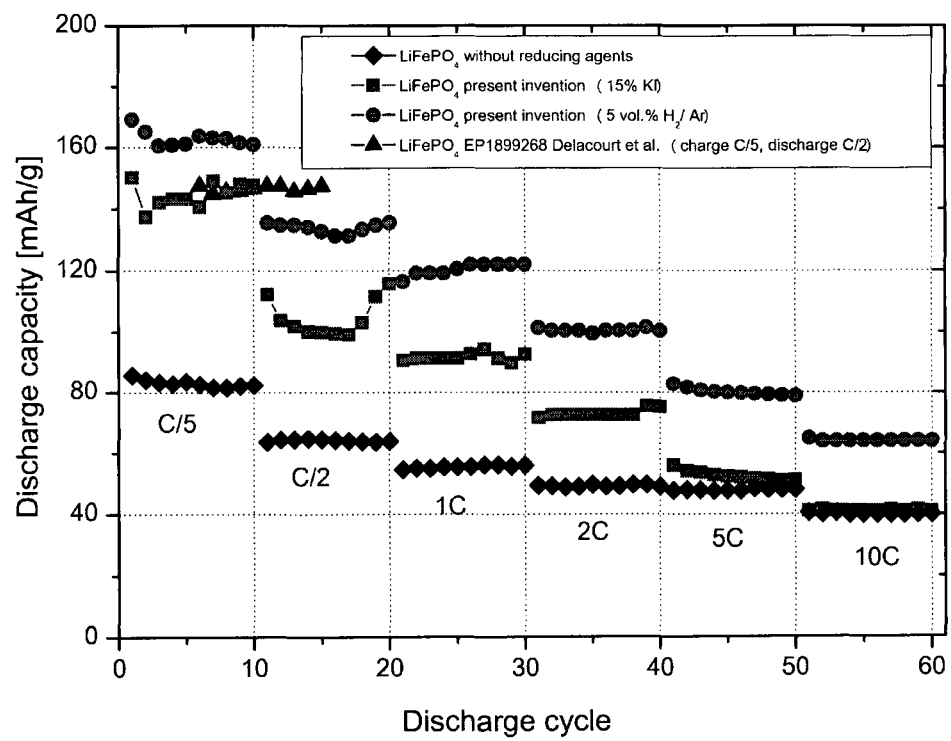

PROCESS OF FABRICATION OF CRYSTALLINE NANOMETRIC LITHIUM TRANSITION METAL PHOSPHATE

This invention relates to a process of fabrication of crystalline nanometric lithium transition metal phosphate, particularly LiFePO$_4$, which is intended for a cathode material in reversible Li-ion batteries (Li-ion cells), suitable to provide more than 2.5 V of output voltage.

Reversible Li-ion batteries are widely used in portable electronics and more recently in powering electric vehicles. Li-ion cells consist of a cathode, a graphitic anode and, separating them, an electrolyte conducting lithium ions. The basic operational parameters of a Li-ion cell, such as voltage, current and power density, depend mainly on the cathode material used. Commonly used cathode materials include layered oxides such as LiCoO$_2$ or oxides possessing a spinel structure, i.e. LiMn$_2$O$_4$. However, these materials are expensive to fabricate and harmful to the environment, and may become degraded during operation.

U.S. Pat. No. 5,910,382 presents compounds, which contain in their structures PO$_4^{3-}$ polyanions and transition metal cations, which can be applied as cathode materials for Li-ion batteries. Among them, lithium iron phosphate LiFePO$_4$ with an olivine crystal structure has the most favourable properties. It possesses high operational voltage of about 3.4 V vs. Li$^+$/Li and high theoretical capacity equal to about 170 mAh/g; additionally, this material exhibits high chemical and thermal stability, is environmentally benign and cheap to fabricate. The listed physicochemical properties make this material particularly advantageous for application in Li-ion cells intended for electric vehicles, where safety issues are crucial. However, it exhibits extremely low mixed ionic-electronic conductivity at the temperatures at which a Li-ion cell operates, which strongly inhibits charge transport in the cathode layer. These limitations prevent this material from being used directly in Li-ion batteries with high current and energy densities.

Many laboratories conduct research devoted to the improvement of the electrochemical properties of LiFePO$_4$. This research is focused on the development of a LiFePO$_4$/carbon composite cathode and preparation of materials with smaller grain sizes, which can shorten the lithium diffusion distance while charging and discharging. Additionally, experimental and theoretical work has revealed that lithium ion transport in this material can occur only along the [010] crystallographic direction [D. Morgan, A. Van der Ven, and G. Ceder, Electrochemical and Solid-State Letters 7 (2004) A30-A32 and R. Amin, P. Balaya, J. Maier, Electrochemical and Solid-State Letters, 10 (2007) A13-A16]. Consequently, it is highly beneficial to conduct synthesis leading to LiFePO$_4$ with nanometric grains possessing exposed [010] planes. [W. Zajac, J. Marzec, W. Maziarz, A. Rakowska, J. Molenda, Functional Materials Letters 4 (2011) 117-122].

In patents [patent applications: WO2010149681 A1, WO2011100487 A2, WO2010023194 A1 and WO2011057646 A1] and in research papers [M. K. Devaraju, I. Honma, Advanced Engineering Materials 2 (2012) 284-297 and A. V. Murugan, T. Muraliganth, A. Manthiram, Electrochemistry Communications 10 (2008) 903-906] several synthesis methods leading to material with nanosize grains, including LiFePO$_4$, were presented. One method of preparation of nanometric phospho-olivine is the introduction of carbon precursors such as sucrose which pyrolyse during thermal treatment at high temperatures in a non-oxidative atmosphere (e.g. 700° C., argon) and reduce grain growth [patent application WO2010149681 A1] into the mixture of reactants, e.g. Li$_2$CO$_3$+FeC$_2$O$_4$+NH$_4$H$_2$PO$_4$, during high-temperature synthesis. On the other hand, applying 'soft chemistry' methods, among others the hydrothermal method [M. K. Devaraju, I. Honma, Advanced Engineering Materials 2 (2012) 284-297] or the co-precipitation method [W. Zajac, J. Marzec, W. Maziarz, A. Rakowska, J. Molenda, Functional Materials Letters 4 (2011) 117-122], enables reduction of the LiFePO$_4$ synthesis temperature, which leads to elimination of the grain growth process occurring at higher temperatures and reduces costs associated with obtaining high temperatures.

Among the procedures of synthesis of nanometric LiFePO$_4$ described in the literature, the method proposed by Delacourt et al. [C. Delacourt, C. Wurm, P. Reale, M. Morcrette, C. Masquelier, Solid State Ionics 173 (2004) 113-118 and patent application EP1899268 B1] seems particularly interesting, but possesses considerable limitations. This method is based on the co-precipitation reaction of nanometric LiFePO$_4$ from LiOH, FeSO$_4$ and H$_3$PO$_4$ dissolved in a mixture of water and organic liquids. In Delacourt's method, at room temperature, dimethyl sulfoxide (DMSO) was gradually added to an aqueous solution containing 0.1-molar solutions of Fe$^{2+}$ and PO$_4^{3-}$ ions, until the mixture contained 50 vol. % water and 50 vol. % DMSO. Then, 0.3 mol Li$^+$ ion solution was added to the obtained mixture until the pH of the latter was within the range 7-7.5 and the molar ratios Li:Fe:P were close to 3:1:1. Subsequently, the mixture was heated, reaching the boiling temperature of the solvent, i.e. between 105 and 120° C. The obtained precipitate was filtered, flushed with distilled water, and, in the final step, annealed at a temperature of 500° C. for 3 h in an atmosphere of nitrogen with 5% hydrogen. As the main limitation of this method, one might cite the relatively large number of Fe(III) ions in the cathode material after co-precipitation, leading to the necessity of additional heat treatment in a reducing atmosphere at temperatures above 200° C. Another drawback of this method is an increase in the fabrication costs of the cathode material related to the multi-step procedure, as well as the growth of LiFePO$_4$ grains, which is inevitable at high temperatures.

The essence of the synthesis procedure of nanometric lithium transition metal phosphate with the chemical formula LiMPO$_4$ (where M denotes a transition metal ion or mixture of transition metal ions selected from a group comprising Fe, Mn, Co and Ni, particularly LiFePO$_4$), using co-precipitation of nanometric powder from a solution of boiling water and organic liquid containing Li$^+$, M$^{2+}$ and PO$_4^{3-}$ ions which, after being filtered and flushed with water as well as ethanol, is dried, is that a reducing agent with a molar quantity ranging from 15 to 100 mol. % in relation to the quantity of transition metal ions is introduced to a solution containing at least one of the ions selected from a group containing Li$^+$, M$^{2+}$, PO$_4^{3-}$, and/or a reducing gas mixture is passed through this solution.

At least one substance selected from group comprising potassium iodide, sodium thiosulphate, glucose, ascorbic acid, and tin(II) chloride is used as a reducing agent.

Advantageously, potassium iodide introduced to the solution, containing Fe$^{2+}$ ions at 15 mol. % in relation to their quantity, is used as a reducing agent.

Advantageously, a mixture containing argon with the addition of 5 vol. % of hydrogen is used as a gaseous reducing agent.

Surprisingly, it turned out that the introduction of the reducing agent into the solution from which nanometric LiMPO$_4$ powder is precipitated hampers the oxidation of M$^{2+}$ ions to M$^{3+}$ ions, and additionally enables the elimination of the final step of annealing the obtained powder in non-oxidative conditions. Additionally, application of a reducing agent enables a reduction in the amount of transition metal (III) in the obtained material from about 25 to about 12 wt. %. The process according to the invention is advantageous, because the procedure of synthesis of LiMPO$_4$ powder can be completed in a single precipitation step, without further annealing needed. Furthermore, the synthesised LiMPO$_4$ powder is carbon-free, shows a lesser content of M$^{3+}$ ions, and features fine grain-size within the range of 30-200 nm. Additionally, surprisingly, the powder obtained according to this process can be directly used as a cathode material in reversible Li-ion cells. Favourably, the process enables improvement of the reversible capacity of cells constructed using the obtained material and reduction of production costs associated with elimination of the final step, which comprises annealing the material at high temperatures.

The present invention is illustrated in examples and in a drawing which presents discharge capacity in the following cycles under various discharge rates of Li/Li$^+$/LiFePO$_4$ cells with cathodes made from olivine materials obtained by co-precipitation, and with potassium iodide in 15 vol. % quantity in relation to the quantity of the iron ions or a gaseous mixture comprising 95 vol. % Ar and 5 vol. % hydrogen used as a reducing agent. The C/n symbol denotes the current density necessary to change lithium in the amount of 1 mol per mol of the cathode material within n hours; the nC symbol denotes the current density necessary to change lithium in the amount of 1 mol per mol of the cathode material within 1/n hours. For the sake of comparison, examinations were conducted of cells with cathodes containing material obtained without the addition of any reducing agent. The FIG. presents discharge capacities in the following cycles under various discharge rates of the Li/Li$^+$/LiFePO$_4$ cells with cathodes made from cathode material disclosed in patent EP 1899268.

EXAMPLE I

In order to prepare 3.2 g crystalline nanometric powder of LiFePO$_4$, initially three solutions were prepared; solution 1 was obtained by mixing 1.36 cm$^3$ 85% aqueous solution of H$_3$PO$_4$ with 100 cm$^3$ of distilled water and 100 cm$^3$ of ethylene glycol in a reactor with a volume of 2000 ml with a reflux condenser. Next, solution 2 was prepared by dissolving 0.498 g KI in 100 cm$^3$ of boiling distilled water; then 5.5601 g of FeSO$_4$.7H$_2$O and 100 cm$^3$ of ethylene glycol were added, in which the amount of KI was equal to 15 mol. % in relation to Fe$^{2+}$ ions. Later, solution 3 was prepared by dissolving 2.5174 g LiOH.H$_2$O in 100 cm$^3$ of boiling distilled water; next, 100 cm$^3$ of ethylene glycol was added. All solutions were heated to the boiling point; solution 2 (boiling) was introduced to the reactor and, after solutions 1 and 2 had been mixed, solution 3 was introduced at a rate of 15 ml/min. During the introduction of solution 3, a grey-green precipitate appeared. The reacting mixture was left in the reactor for 16 hours at boiling temperature under a reflux condenser. Next, the reaction mixture was cooled to room temperature and the precipitate was filtered from the solution using a Büchner funnel and washed three times with distilled water and three times with isopropyl alcohol. Next the filtered precipitate was dried in a vacuum dryer at 70° C. for 12 hours to obtain a crystalline nanometric LiFePO$_4$ powder with an olivine structure and Fe(III) content of 19.5 wt. %; the crystallite size of the obtained cathode material was 30-200 nm and the yield of the synthesis was over 90%.

EXAMPLE II

In order to prepare 3.2 g crystalline nanometric powder of LiFePO$_4$, initally three solutions were prepared; solution 1 was obtained by mixing 1.36 cm$^3$ 85% aqueous solution of H$_3$PO$_4$ with 100 cm$^3$ of distilled water and 100 cm$^3$ of ethylene glycol in a reactor with a volume of 2000 ml with a reflux condenser. Solution 1 was heated to the boiling point and a gas mixture composed of argon and 5 vol. % of hydrogen was passed through it for 40 minutes at a rate of 50 ml/min. Next, solution 2 was prepared by dissolving 5.5601 g of FeSO$_4$.7H$_2$O in 100 cm$^3$ of boiling distilled water and 100 cm$^3$ of ethylene glycol. Later, solution 3 was prepared by dissolving 2.5174 g LiOH.H$_2$O in 100 cm$^3$ of boiling distilled water; next, 100 cm$^3$ of ethylene glycol was added. Solution 2 (boiling) was introduced into the reactor containing solution 1 (boiling), through which a gas mixture composed of argon and 5 vol. % of hydrogen was passed at a rate of 50 ml/min; then solution 3 (boiling) was introduced at a rate of 15 ml/min. During the introduction of solution 3, a grey-green precipitate appeared. The reacting mixture was left in the reactor for 16 hours at boiling temperature under a reflux condenser with a continuous flow of the gas mixture. Next, the reaction mixture was cooled to room temperature and the precipitate was filtered from the solution using a Büchner funnel and washed three times with distilled water and three times with isopropyl alcohol. Next, the filtered precipitate was dried in a vacuum dryer at 70° C for 12 hours to obtain crystalline nanometric LiFePO$_4$ powder with an olivine structure and a Fe(III) content of 12.0 wt. %; the crystallite size of the obtained cathode material was 30-200 nm and the yield of the synthesis was over 90%.

The invention claimed is:

1. A process of fabrication of nanometric lithium iron phosphate with the formula LiFePO$_4$, using a co-precipitation method, at temperature no greater than 110 degree centigrade, to get a precipitate from a boiling aqueous solution containing Li$^+$, PO$_4^{3-}$ ions and an organic liquid, which, after filtering and washing with distilled water and alcohol, is dried, characterised in that that to the boiling aqueous solution a reducing agent is introduced in the amount of 10-100 mol. % in relation to iron ions and/or a reducing gas mixture is passed through the aqueous solution, wherein the co-precipitation is performed at a pressure equal to the atmospheric pressure, wherein at least one of substances from a group comprising potassium iodide, ammonium thiosulphate, and tin(II) chloride is applied as a reducing agent.

2. A process of fabrication of nanometric lithium iron phosphate with the formula LiFePO$_4$, using a co-precipitation method, at temperature no greater than 110 degree centigrade, to get a precipitate from a boiling aqueous solution containing Li$^+$, PO$_4^{3-}$ ions and an organic liquid, which, after filtering and washing with distilled water and alcohol, is dried, characterised in that that to the boiling aqueous solution a reducing agent is introduced in the amount of 10-100 mol. % in relation to iron ions and/or a reducing gas mixture is passed through the aqueous solution, wherein the co-precipitation is performed at a pressure equal to the atmospheric pressure, wherein potassium iodide is introduced to the solution containing Fe$^{2+}$ ions in the amount of 15 mol. % as the reducing agent.

3. A process of fabrication of nanometric lithium iron phosphate with the formula LiFePO$_4$, using a co-precipitation method from a boiling aqueous solution containing $Li^+$, $PO_4^{3-}$ ions and an organic liquid, which after filtering and washing with distilled water and alcohol, is dried, characterised in that that the boiling aqueous solution contains a reducing agent in the amount of 10-100 mol. % in relation to iron ions, and /or a reducing gas mixture is passed through the solution, wherein at least one of substances from a group comprising potassium iodide, ammonium thiosulphate, and tin(II) chloride is applied as a reducing agent.

4. A process of fabrication of nanometric lithium iron phosphate with the formula $LiFePO_4$, using a co-precipitation method from a boiling aqueous solution containing $Li^+$, $PO_4^{3-}$ ions and an organic liquid, which after filtering and washing with distilled water and alcohol, is dried, characterised in that that the boiling aqueous solution contains a reducing agent in the amount of 10-100 mol. % in relation to iron ions, and /or a reducing gas mixture is passed through the solution, wherein wherein potassium iodide is introduced to the solution containing $Fe^{2+}$ ions in the amount of 15 mol % as the reducing agent.

* * * * *